(12) United States Patent
Heindel et al.

(10) Patent No.: US 6,318,985 B1
(45) Date of Patent: Nov. 20, 2001

(54) TWO-PIECE SEGMENTED MOLD

(75) Inventors: John F. Heindel, Spartanburg; Joe E. Birch, Jr., Roebuck; Richard A. Spivey, Simpsonville; Lawrence W. Stachniak, Greenville; Robert G. Tyler, Spartanburg, all of SC (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/663,290

(22) Filed: Sep. 15, 2000

(51) Int. Cl.[7] .................................................. B29C 35/02
(52) U.S. Cl. ...................... 425/46; 425/DIG. 60
(58) Field of Search ............................... 425/28.1, 35, 46, 425/DIG. 60

(56) References Cited

U.S. PATENT DOCUMENTS

| | | | |
|---|---|---|---|
| 3,778,203 | * 12/1973 | MacMillan | 425/47 |
| 4,013,390 | * 3/1977 | Moeller et al. | 425/46 |
| 5,208,044 | * 5/1993 | Miyata et al. | 425/46 |
| 5,676,980 | * 10/1997 | Gulka et al. | 425/46 |
| 5,980,810 | * 11/1999 | Ladouce | 425/46 |
| 6,017,206 | * 1/2000 | Soulalioux | 425/46 |

* cited by examiner

Primary Examiner—James P. Mackey
(74) Attorney, Agent, or Firm—Martin Farrell; Alan A. Csontos

(57) ABSTRACT

An improved two-piece segmented mold includes a plurality of tread mold segments mounted to a frustoconical seat in a mold back by a T-shaped guide bar inserted in a guide slot formed in the seat. The segments are biased to a normally closed position in abutment with adjacent segments and in abutment with a mold side plate.

6 Claims, 4 Drawing Sheets

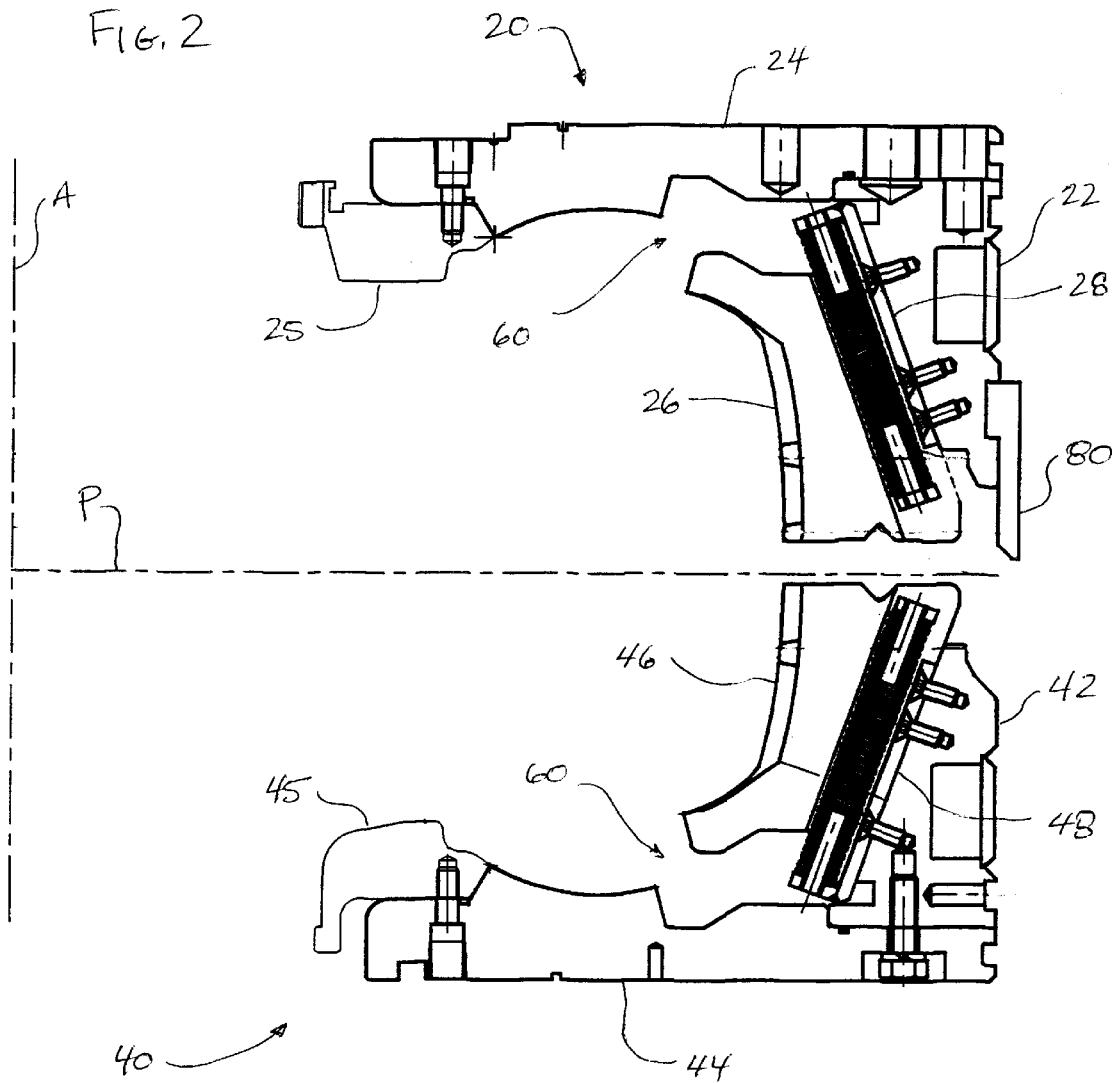

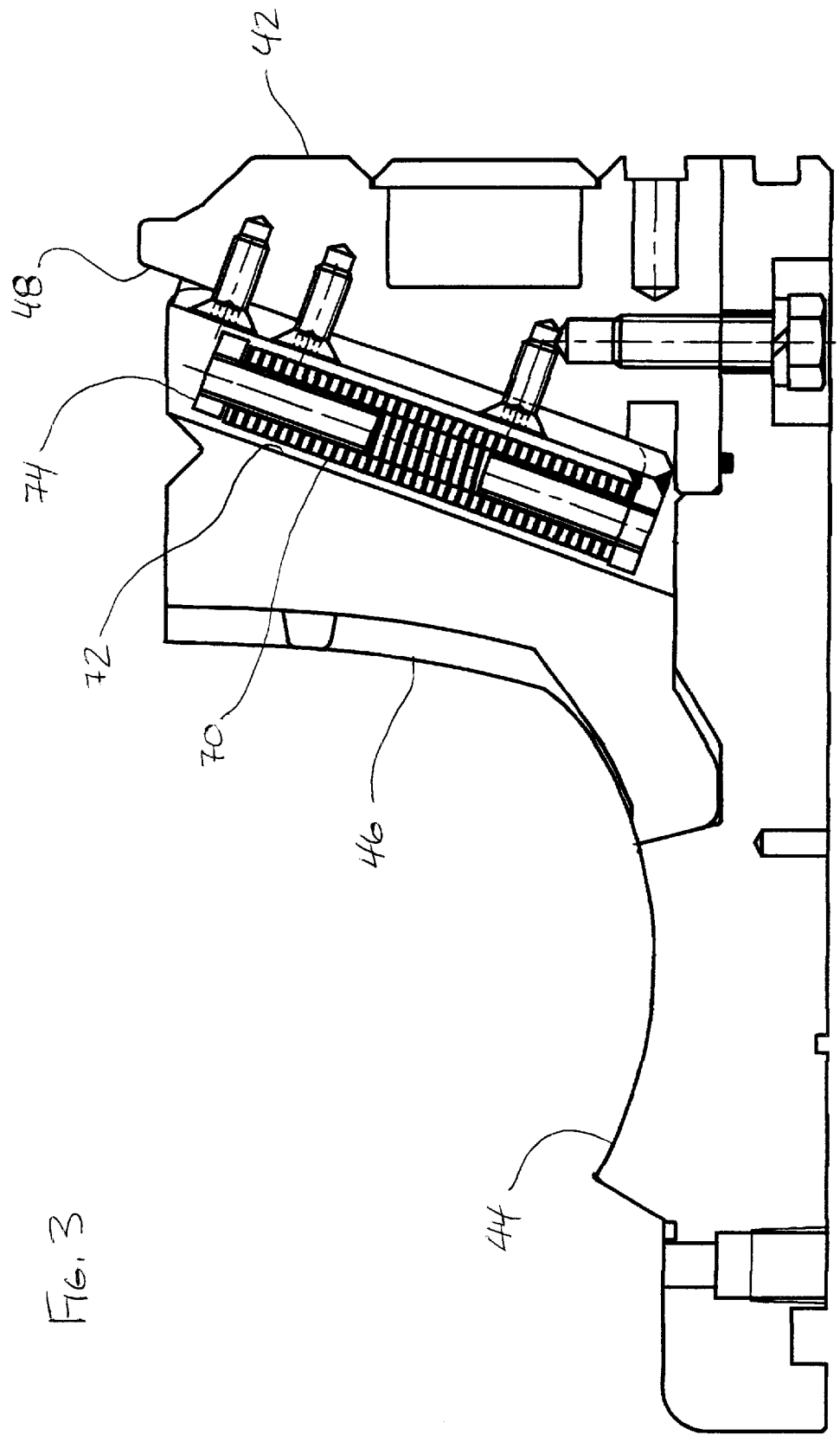

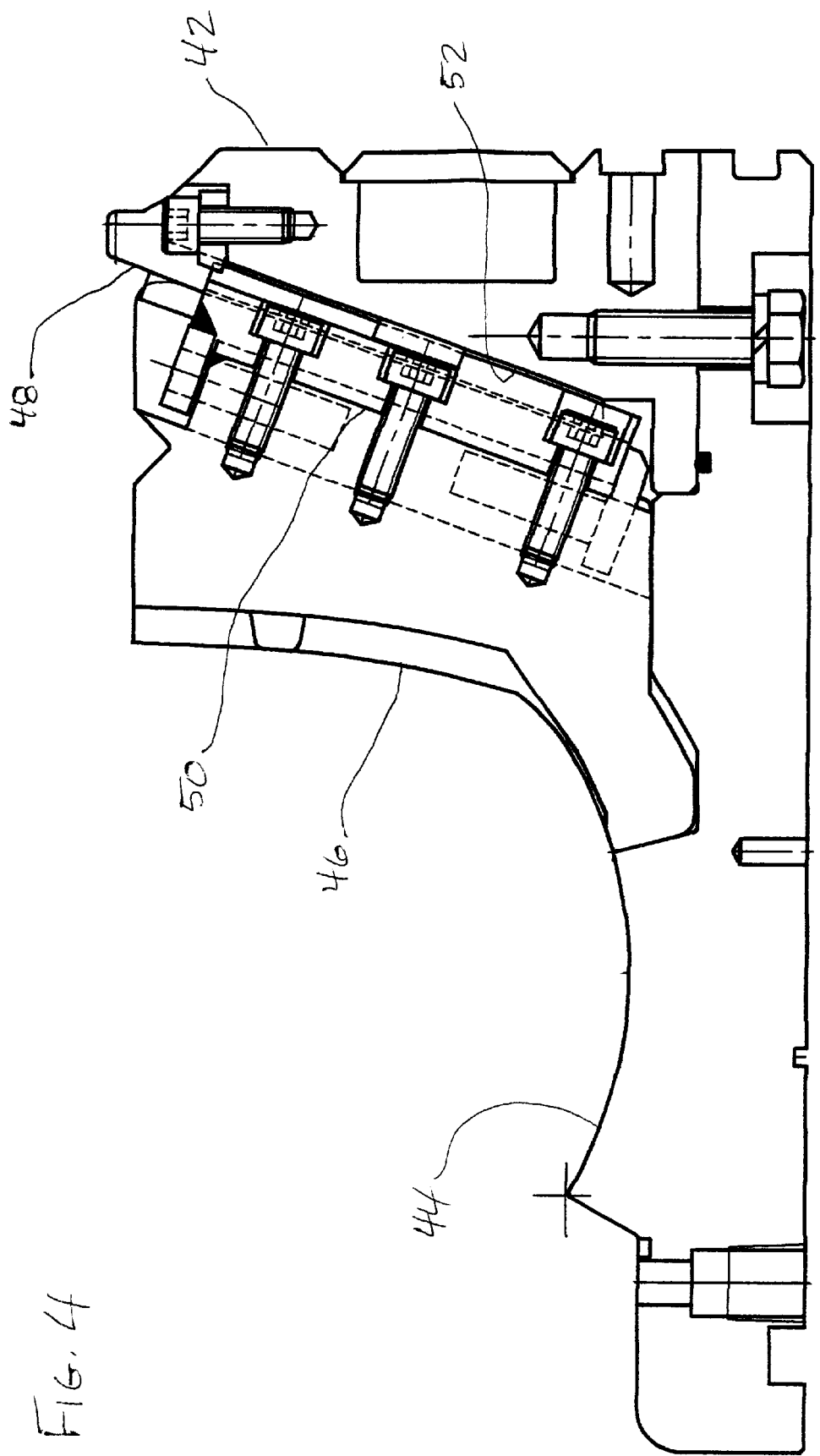

TWO-PIECE SEGMENTED MOLD

BACKGROUND AND SUMMARY OF THE INVENTION

The present invention relates to molds for tires, and more specifically, to an improved two-piece segmented mold.

Two-piece segmented molds include a top half and a bottom half that meet typically at an approximately axially centered parting line. Each half has a frustoconical seat which widens toward the parting line to carry a plurality of tread mold segments. The tread mold segments are installed in the seats of each of the top and bottom parts for sliding movement on guide pins or other guiding features. Top and bottom segments meet at the narrower end of the seat in the closed mold to form the tread mold ring. When the mold is opened after the cure stage, the segments slide axially inward, that is, toward the parting line, and radially outward away from the axis on the frustoconical seat. The movement of the segments is relatively away from the tire tread, which releases the molded tread from the mold segments.

In conventional two-piece segmented molds, the segments are biased by springs to assume a normally open position, that is, spaced axially inward and radially outward relative to the mold parts.

When an uncured tire is placed in the mold and the mold is closed, the segments are pushed back into contact with the mold part and with each other to form a continuous tread mold surface. A problem in the conventional design is that the sidewall of an uncured tire is soft and flexible and can be pinched in the gap between the moving tread segment and the sidewall plate when the mold is closed. This produces flashing on the tire sidewall, which is unsightly and undesirable in a cured tire. Removal of flashing requires a secondary operation which entails additional time, cost, and handling.

The invention solves this problem by providing a two-piece segmented mold in which the tread segments are biased to abut a side plate in a normally closed position, rather than being normally spaced from the side plate. In the abutting position, there is no gap between the tread segments and the side plate, which avoids pinching an uncured tire when the mold shells are closed.

According to a preferred embodiment, the segments are biased by springs acting on the tread segment, and more preferably by extension springs. According to one embodiment, the springs act between the segment and a mold back part of both mold half shells. Alternatively, the tread segments of the bottom mold half shell are biased by gravity to slide to the closed position, and the segments of the top mold half shell are biased by springs.

According to another aspect of the invention, the mold half shells include guide slots for guiding the movement of the segments between the open and closed positions. The guide slots are T-shaped, and engage a T-shaped guide bar fastened on the back of each segment. A stop plate fastened at the top of the guide slot keeps the guide bar in the slot. The guide slot and guide bar arrangement provides for smooth movement of the segments and secure positioning in the closed position.

Another aspect of the invention is a skirt mounted on the top shell or mold back and depending downward toward the bottom shell. The skirt engages the bottom shell or mold back before the mold parts completely close to form a seal around the interior of the mold. A vacuum source activates to evacuate air from the mold interior before the mold closes and before the bladder placed in the uncured tire interior is fully pressurized. Air that could have been trapped between the uncured tire and the molding surfaces is removed for better molding contact.

BRIEF DESCRIPTION OF THE DRAWINGS

The invention will be better understood by reference to the following detailed description in conjunction with the appended drawings, in which:

FIG. 2 is a section view of the mold of FIG. 1 shown in an open position, the section being taken at a spring mechanism;

FIG. 3 is an enlarged section view of a bottom half of the mold of FIG. 2 showing a biasing spring mechanism;

FIG. 4 is an enlarged section view of a bottom half of the mold of FIG. 1 showing a guide slot and guide bar; and, FIG. 5 is a top partial view of the mold of FIG. 1.

DETAILED DESCRIPTION OF THE INVENTION

Figure 1:
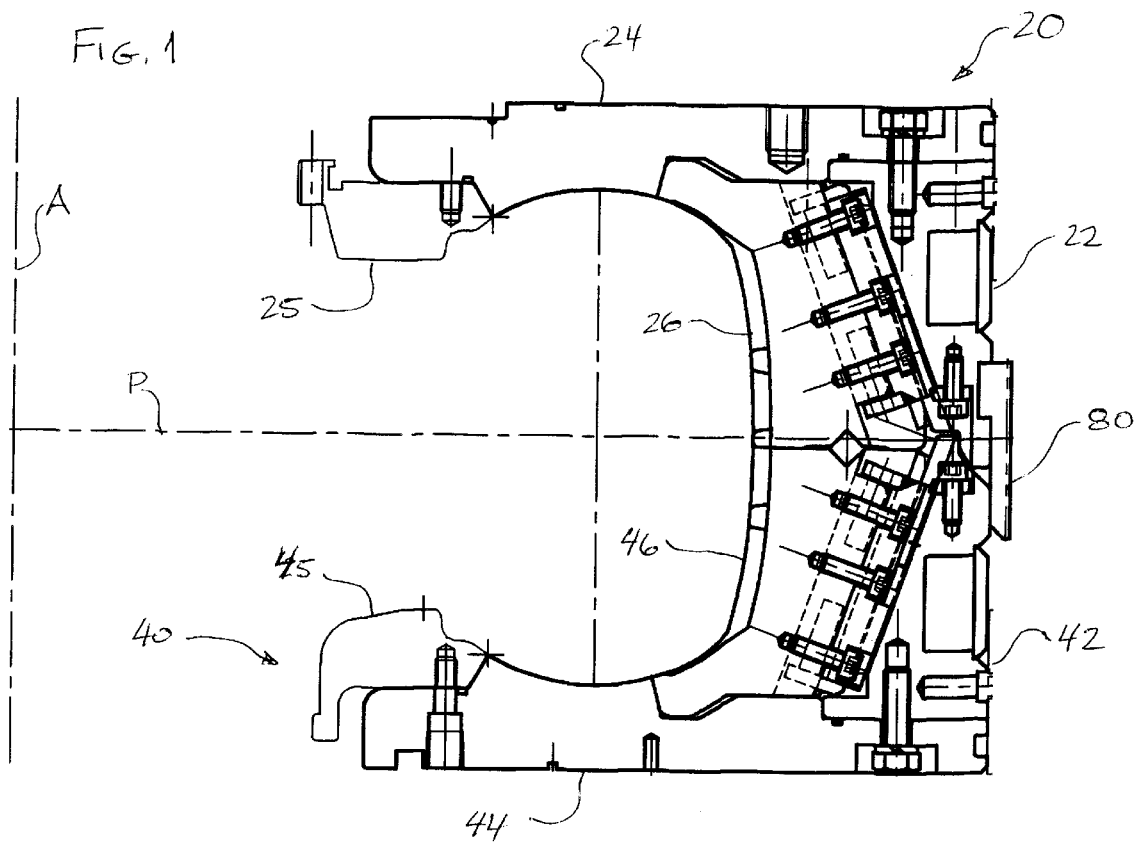
FIG. 1 is a section view of a two-piece segmented mold in accordance with the invention shown in a closed position, the section being taken at a guide mechanism.

An improved two piece segmented mold is shown in section view in FIG. 1 in a closed position and in FIG. 2 in an open position. FIG. 1 and FIG. 2 show a right hand side of the mold, it being understood that, with respect to the subject matter of the invention, the left side is a mirror image. The section in FIG. 1 is taken through a guide arrangement, and FIG. 2 through a spring arrangement, which are further described below. A mold axial center line A and a parting line P are indicated in broken lines.

The mold includes a top shell 20 and a bottom shell 40 that are relatively movable in a vertical direction (parallel to axis A) and separate at the parting line P for loading and unloading tires. The top shell 20 includes a top mold back 22 that forms a ring to support the other mold elements, a top side plate 24 that molds the side wall of the tire, and a plurality of tread mold segments 26 movably mounted to the top mold back 22. A bead ring 25 attached to the top side plate 24 molds the bead portion of the tire. The mold bottom shell 40 similarly includes a mold back 42, a bottom side plate 44, and a plurality of tread mold segments 46. Also shown is a bottom bead ring 45.

As may be seen in FIG. 2, with the mold in an open position, the top mold shell 20 and bottom mold shell 40 are axially spaced from the parting line P. The top tread mold segments 26 and bottom tread mold segments 46 are spaced from the respective top and bottom side plate 24, 44 both vertically (or axially) and radially outward. Although not shown, it is understood also that the tread mold segments 26, 46 are also mutually circumferentially spaced in the open position.

Figure 5:
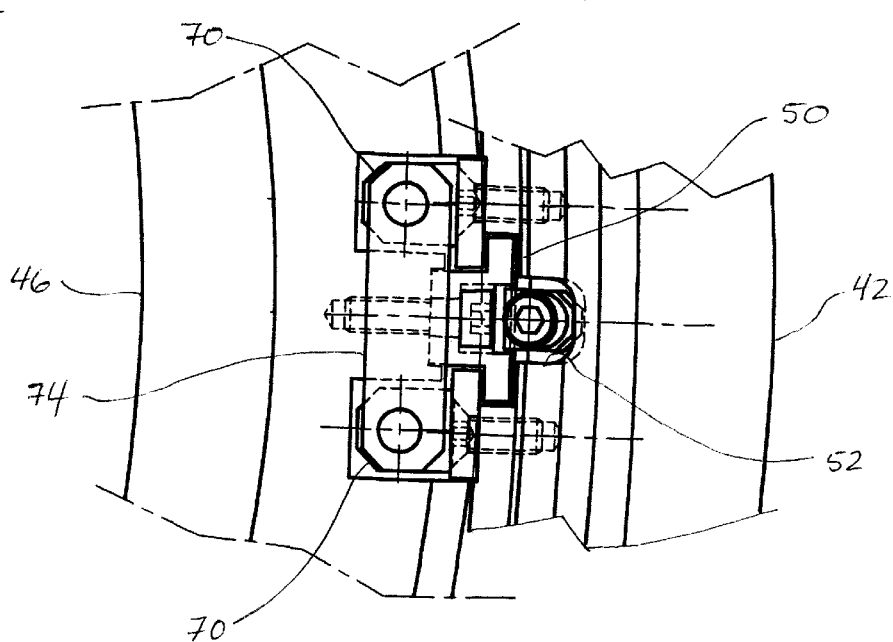

The top mold back 22 and bottom mold back 42 are each formed with a frustoconical seat 28, 48 that diverges away from the respective mold side plate 24, 44, allowing the tread segments to move to the axially and radially spaced open position shown in FIG. 2. Referring now also to FIG. 4 and FIG. 5, the segments 46 (it being understood that the top mold half segments 26 are similar) are guided for movement by a guide bar 50 fastened or formed on the back of the segment that engages a guide slot 52 formed in the mold back seat 28, 48. The guide bar 50 and guide slot 52 are T-shaped to constrain movement along the direction of the slot and prevent pivoting of the segment relative to the mold back.

The segments 26, 46 are biased to assume a normally closed position, the position shown in FIG. 1. In the closed position, the segments 26, 46 abut the respective side plate 24, 44, and abut each adjacent segment. As seen in FIG. 2, in the open position, a gap 60 is formed between the segments 26, 46 and the respective side plate 24, 44. When an uncured tire is placed in an open mold, the tire can become pinched in the gap 60 when the mold is closed because uncured rubber is relatively soft and pliable. This results in flashing at the gap area, which is unsightly and undesirable.

By biasing the segments to the closed position, pinching the rubber in the gap is avoided. FIG. 3 is an enlarged section of FIG. 2 showing a biasing device in accordance with a preferred embodiment of the invention. A pair of extension springs 70 are mounted in cavities 72 in each segment 26, 46 and attached to the respective mold back 22, 42 to act in parallel with the frustoconical seat. As seen in FIG. 5, the springs 70 are mounted on either side of the guide bar 50. A removable head plate 74 retains the springs 70 and allows access for maintenance or replacement.

In conventional two-piece segmented molds, the segments are biased to assume the open position. This is believed in the art to assist in releasing the tire tread from the mold segments. The present inventors have found that the opening action of the mold itself allows the molded fire to carry the segments until the radially outward movement of the segments along the respective seats releases them from the tire tread.

Referring to FIG. 2, another feature of the mold of the invention is a vacuum system to evacuate air from the interior of the mold as it closes. A resilient skirt 80 is attached to the top mold back 22 and extends axially downward. The skirt 80 engages the bottom mold back 42 before the mold parts close, creating a seal around the partially open mold. A vacuum source (not shown) activates when the skirt engages the bottom mold back 42 to evacuate air from the interior of the mold, which helps ensure that air is not trapped between the uncured tire and the molding surfaces.

The invention has been described in terms of preferred principles, embodiments, structure, however, those skilled in the art will recognize that substitutions and equivalents can be made without departing from the scope of the invention as defined in the following claims.

What is claimed is:

1. An improved two-piece segmented mold, comprising:
   a top half shell having a top side part and a top back part, the top back part having a frustoconical seat extending axially inward and radially outward from the top side part;
   a plurality of tread mold segments movably mounted to the seat to define a portion of a tread ring;
   biasing means to urge the tread mold segments to a closed position in mutual abutment and in abutment with the top side part;
   a bottom half shell having a bottom side part and a bottom back part, the bottom back part having a frustoconical seat extending axially inward and radially outward from the bottom side part;
   a plurality of tread mold segments movably mounted to the seat to define a portion of a tread ring; and,
   biasing means to urge the tread mold segments to a closed position in mutual abutment and in abutment with the bottom side part.

2. The improved two-piece segmented mold as claimed in claim 1, wherein the biasing means comprises in each tread mold segment a pair of springs connected between the tread mold segment and the respective mold back part.

3. The improved two-piece segmented mold as claimed in claim 1, further comprising a plurality of T-shaped guide bars, one guide bar mounted to each of the plurality of tread mold segments and wherein the seats of the top back part and bottom back part have a plurality of T-shaped slots, each guide bar being inserted for sliding in a slot.

4. The improved two-piece segmented mold as claimed in claim 1, wherein the biasing means in the bottom half shell is gravity acting on the tread mold segment.

5. The improved two-piece segmented mold as claimed in claim 4, wherein the biasing means in the top half shell includes a plurality of springs, a pair of springs acting on each tread mold segment.

6. The improved two-piece segmented mold as claimed in claim 1, further comprising a skirt mounted to the top half shell and depending axially downward therefrom for engaging the bottom half shell to form an air seal about a mold interior, and a vacuum source for evacuating air from the mold interior.

\* \* \* \* \*